(12) United States Patent
Toki

(10) Patent No.: US 8,051,388 B2
(45) Date of Patent: Nov. 1, 2011

(54) DEVICE HAVING BOOKMARK THUMBNAIL MANAGEMENT FUNCTION

(75) Inventor: Hiroyuki Toki, Sunnyvale, CA (US)

(73) Assignee: Access Co., Ltd., Tokyo (JP)

( * ) Notice: Subject to any disclaimer, the term of this patent is extended or adjusted under 35 U.S.C. 154(b) by 997 days.

(21) Appl. No.: 11/515,437

(22) Filed: Aug. 31, 2006

(65) Prior Publication Data

US 2008/0059906 A1 Mar. 6, 2008

(51) Int. Cl.
*G06F 3/048* (2006.01)
(52) U.S. Cl. ......... 715/838; 715/810; 715/834; 715/835
(58) Field of Classification Search .................. 715/810, 715/834, 835, 838
See application file for complete search history.

(56) References Cited

U.S. PATENT DOCUMENTS

| | | | | |
|---|---|---|---|---|
| 6,590,586 | B1 * | 7/2003 | Swenton-Wall et al. | 715/730 |
| 7,044,912 | B2 * | 5/2006 | Babu et al. | 600/437 |
| 7,251,775 | B1 * | 7/2007 | Astala et al. | 715/205 |
| 7,730,425 | B2 * | 6/2010 | de los Reyes et al. | 715/835 |
| 2004/0169683 | A1 * | 9/2004 | Chiu et al. | 345/776 |
| 2005/0160377 | A1 * | 7/2005 | Sciammarella et al. | 715/838 |
| 2005/0216850 | A1 * | 9/2005 | Ramos et al. | 715/763 |
| 2005/0235335 | A1 * | 10/2005 | Morita et al. | 725/133 |
| 2006/0064716 | A1 * | 3/2006 | Sull et al. | 725/37 |
| 2006/0095865 | A1 * | 5/2006 | Rostom | 715/810 |
| 2006/0248560 | A1 * | 11/2006 | Wada et al. | 725/89 |
| 2007/0130518 | A1 * | 6/2007 | Shavit et al. | 715/530 |
| 2007/0189737 | A1 * | 8/2007 | Chaudhri et al. | 386/125 |

FOREIGN PATENT DOCUMENTS

| | | |
|---|---|---|
| JP | 2002132828 | 5/2002 |
| JP | 2002288199 | 10/2002 |

* cited by examiner

*Primary Examiner* — Boris Pesin
*Assistant Examiner* — Andres E Gutierrez
(74) *Attorney, Agent, or Firm* — Morrison & Foerster LLP

(57) ABSTRACT

There is provided a device having a function of browsing contents obtained through a network. The device includes a display unit, an operation unit, a storing unit configured to store a thumbnail corresponding to a part of a captured image of contents as a bookmark, and a thumbnail rearrangement control unit configured to form a screen displaying stored thumbnails on the display unit while arranging the thumbnails in a ring shape, to accept user designation of a target thumbnail to be moved through the operation unit, to rotate the thumbnails arranged in the ring shape on the screen in response to a user operation through the operation unit while keeping a potion of the target thumbnail at a predetermined position in the screen, and to accept user designation of a target position to which the target thumbnail is to be moved through the operation unit.

13 Claims, 9 Drawing Sheets

DEVICE HAVING BOOKMARK THUMBNAIL MANAGEMENT FUNCTION

BACKGROUND OF THE INVENTION

The present invention relates to a device such as a mobile phone having a function of managing thumbnail images as bookmarks.

Web browsers having a function of managing thumbnail images as bookmarks have been proposed. By managing thumbnail images as bookmarks, a user of the web browser is able to select one of the bookmarks (thumbnail images) while visually recognizing the selectable bookmarks (thumbnail images) which the user has stored in the user's device. Examples of such a browser are disclosed in Japanese Patent Provisional Publication Nos. P2002-132828A and P2002-288199A. In these publications, bookmarks (thumbnail images) are arranged in a matrix or in a line in a horizontal or vertical direction. Hereafter, the thumbnail image managed as a bookmark is referred to as a "bookmark thumbnail".

Frequently, the user of the device wants to rearrange the bookmark thumbnails in a particular order. In this case, the user needs to operate the device to select a bookmark thumbnail and to move the selected bookmark thumbnail to a desirable position. More specifically, if the device does not have a pointing device, the user needs to designate a bookmark thumbnail to be moved and to move only a focus to a position to which the designated bookmark thumbnail is to be inserted. If the number of bookmark thumbnails stored in the device increases to the extent that all of the bookmark thumbnails can not be displayed on a display of the device simultaneously, the user needs to decide a position to which the designated bookmark thumbnail is to be inserted in a situation where the selected bookmark thumbnail is offscreen. Even if the device has a pointing device, the user can not avoid such an inconvenient situation.

SUMMARY OF THE INVENTION

The present invention is advantageous in that it provides a device configured to enhance the usability of managing bookmark thumbnails.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

According to an aspect of the invention, there is provided a device having a function of browsing contents obtained through a network. The device is provided with a display unit, an operation unit operated by a user, a storing unit configured to store a thumbnail corresponding to a part of a captured image of contents as a bookmark, and a thumbnail rearrangement control unit configured to form a screen displaying stored thumbnails on the display unit while arranging the thumbnails in a ring shape, to accept user designation of a target thumbnail to be moved through the operation unit, to rotate the thumbnails arranged in the ring shape on the screen in response to a user operation through the operation unit while keeping a potion of the target thumbnail at a predetermined position in the screen, and to accept user designation of a target position to which the target thumbnail is to be moved through the operation unit.

With this configuration, the user is able to designate the target position to which the selected bookmark thumbnail is to be inserted while visually recognizing both of the selected bookmark thumbnail and the target position. Therefore, usability of rearranging bookmark thumbnails can be enhanced in particular for a device which is provided with only a five-way key and does not provided with a pointing device.

In at least one aspect, the thumbnail rearrangement control unit recognizes the target position as a position between bookmark thumbnails situated next to the target thumbnail on the screen.

In at least one aspect, the storing unit stores a thumbnail as a bookmark by displaying a registration area designation frame on contents, moving the registration area designation frame on the contents in response to a user operation through the operation unit, accepting user designation for designating a region in the contents to be stored as a thumbnail and represented by the registration area designation frame, storing a thumbnail corresponding the region in the contents as a bookmark while associating at least position information representing a positional relationship between the region and an entire page of the contents with the thumbnail stored as the bookmark.

In at least one aspect, the storing unit stores an entire image of the contents and a thumbnail corresponding the region in the contents as a bookmark while associating the entire image of the contents and the position information with the thumbnail stored as the bookmark.

In at least one aspect, the position information includes at least one of a tag, a word and a character string contained in the region of the contents.

In at least one aspect, the position information includes a byte number of the region counted form a top of the contents.

In at least one aspect, the device further comprises a link control unit configured to display thumbnails saved as bookmarks, to accept user selection of one of the saved thumbnails, to obtain contents corresponding to the selected one of the saved thumbnails through the network, and to display a part of the obtained contents corresponding to a region in the contents represented by the selected thumbnails in accordance with the position information.

In at least one aspect, the device further comprises an edit control unit configured to display thumbnails saved as bookmarks, to accept user selection of one of the saved thumbnails, to display contents corresponding to the selected thumbnail, to display a registration area designation frame on the contents, to move the registration area designation frame on the contents in response to a user operation through the operation unit, to accept user designation for designating a region in the contents to be newly stored as a thumbnail and represented by the registration area designation frame, to newly store a thumbnail corresponding the region in the contents as a bookmark while associating an entire page of the contents and position information representing a positional relationship between the region and the entire page of the contents with the thumbnail stored as the bookmark.

In at least one aspect, the device further comprises an edit control unit configured to display thumbnails saved as bookmarks, to accept user selection of one of the saved thumbnails, to display contents corresponding to the selected thumbnail, to display a registration area designation frame on the contents, to move the registration area designation frame on the contents in response to a user operation through the operation unit, to accept user designation for designating a region in the contents to be newly stored as a thumbnail and represented by the registration area designation frame, to newly store a thumbnail corresponding the region in the contents as a bookmark while associating an entire image of the contents and position information representing a positional relationship between the region and the entire image of the contents with the thumbnail stored as the bookmark.

According to another aspect of the invention, there is provided a device having a function of browsing contents obtained through a network. The device is provided with a display unit, an operation unit operated by a user, and a storing unit configured to store a thumbnail as a bookmark by displaying a registration area designation frame on contents, moving the registration area designation frame on the contents in response to a user operation through the operation unit, accepting user designation for designating a region in the contents to be stored as a thumbnail and represented by the registration area designation frame, storing a thumbnail corresponding the region in the contents as a bookmark while associating an entire page of the contents and position information representing a positional relationship between the region and an entire page of the contents with the thumbnail stored as the bookmark. The device is further provided with a link control unit configured to display thumbnails saved as bookmarks, to accept user selection of one of the saved thumbnails, to obtain contents corresponding to the selected one of the saved thumbnails through the network, and to display a part of the obtained contents corresponding to a region in the contents represented by the selected thumbnails, and an edit control unit configured to display thumbnails saved as bookmarks, to accept user selection of one of the saved thumbnails, to display contents corresponding to the selected thumbnail, to display a registration area designation frame on the contents, to move the registration area designation frame on the contents in response to a user operation through the operation unit, to accept user designation for designating a region in the contents to be newly stored as a thumbnail and represented by the registration area designation frame, to newly store a thumbnail corresponding the region in the contents as a bookmark while associating an entire page of the contents and position information representing a positional relationship between the region and the entire page of the contents with the thumbnail stored as the bookmark.

With this configuration, the user is able to start to browse contents at a position corresponding to a designated bookmark thumbnail.

With regard to the above mentioned device the operation unit may comprise a five-way key. The device may be a mobile phone.

According to another aspect of the invention, there is provided a method of rearranging thumbnails saved as bookmarks in a device having a function of browsing contents obtained through a network. The method comprises forming a screen displaying stored thumbnails on a display unit while arranging the thumbnails in a ring shape, accepting user designation of a target thumbnail to be moved through an operation unit, rotating the thumbnails arranged in the ring shape on the screen in response to a user operation through the operation unit while keeping a potion of the target thumbnail at a predetermined position in the screen, and accepting user designation of a target position to which the target thumbnail is to be moved through the operation unit.

With this configuration, the user is able to designate the target position to which the selected bookmark thumbnail is to be inserted while visually recognizing both of the selected bookmark thumbnail and the target position. Therefore, usability of rearranging bookmark thumbnails can be enhanced in particular for a device which is provided with only a five-way key and does not provided with a pointing device.

According to another aspect of the invention, there is provided a method of managing thumbnails saved as bookmarks in a device having a function of browsing contents obtained through a network. The method comprises displaying a registration area designation frame on contents, moving the registration area designation frame on the contents in response to a user operation through an operation unit, accepting user designation for designating a region in the contents to be stored as a thumbnail and represented by the registration area designation frame, and storing a thumbnail corresponding the region in the contents as a bookmark while associating at least position information representing a positional relationship between the region and an entire page of the contents with the thumbnail stored as the bookmark;

With this configuration, the user is able to start to browse contents at a position corresponding to a designated bookmark thumbnail.

In at least one aspect, in the storing step, an entire image of the contents and the position information are stored in association with the thumbnails stored as the bookmark.

In at least one aspect, the method further comprises controlling linking of a thumbnail by displaying thumbnails saved as bookmarks, accepting user selection of one of the saved thumbnails, obtaining contents corresponding to the selected one of the saved thumbnails through the network, and displaying a part of the obtained contents corresponding to a region in the contents represented by the selected thumbnails in accordance with the position information.

In at least one aspect, the method further comprises controlling editing of a thumbnail by displaying thumbnails saved as bookmarks, accepting user selection of one of the saved thumbnails, displaying contents corresponding to the selected thumbnail, displaying a registration area designation frame on the contents, moving the registration area designation frame on the contents in response to a user operation through the operation unit, accepting user designation for designating a region in the contents to be newly stored as a thumbnail and represented by the registration area designation frame, and newly storing a thumbnail corresponding the region in the contents as a bookmark while associating an entire page of the contents and position information representing a positional relationship between the region and the entire page of the contents with the thumbnail stored as the bookmark.

According to another aspect of the invention, there is provided a computer program product comprising computer readable instructions that cause a computer to form a screen displaying stored thumbnails on a display unit while arranging the thumbnails in a ring shape, accept user designation of a target thumbnail to be moved through an operation unit, rotate the thumbnails arranged in the ring shape on the screen in response to a user operation through the operation unit while keeping a potion of the target thumbnail at a predetermined position in the screen, and accept user designation of a target position to which the target thumbnail is to be moved through the operation unit.

With this configuration, the user is able to designate the target position to which the selected bookmark thumbnail is to be inserted while visually recognizing both of the selected bookmark thumbnail and the target position. Therefore, usability of rearranging bookmark thumbnails can be enhanced in particular for a device which is provided with only a five-way key and does not provided with a pointing device.

According to another aspect of the invention, there is provided a computer program product comprising computer readable instructions that cause a computer to display a registration area designation frame on contents, to move the registration area designation frame on the contents in response to a user operation through an operation unit, to accept user designation for designating a region in the contents to be stored as a thumbnail and represented by the registration area designation frame, and to store a thumbnail corresponding the region in the contents as a bookmark while associating at least position information representing a positional relationship between the region and an entire page of the contents with the thumbnail stored as the bookmark.

With this configuration, the user is able to start to browse contents at a position corresponding to a designated bookmark thumbnail.

In at least one aspect, the instructions are further configured to store a thumbnail by associating an entire image of the contents and the position information with the thumbnails stored as the bookmark.

In at least one aspect, the instructions are further configured to control linking of a thumbnail by displaying thumbnails saved as bookmarks, accepting user selection of one of the saved thumbnails, obtaining contents corresponding to the selected one of the saved thumbnails through the network, and displaying a part of the obtained contents corresponding to a region in the contents represented by the selected thumbnails in accordance with the position information.

In at least one aspect, the instructions are further configured to control editing of a thumbnail by displaying thumbnails saved as bookmarks, accepting user selection of one of the saved thumbnails, displaying contents corresponding to the selected thumbnail, displaying a registration area designation frame on the contents, moving the registration area designation frame on the contents in response to a user operation through the operation unit, accepting user designation for designating a region in the contents to be newly stored as a thumbnail and represented by the registration area designation frame, and newly storing a thumbnail corresponding the region in the contents as a bookmark while associating an entire page of the contents and position information representing a positional relationship between the region and the entire page of the contents with the thumbnail stored as the bookmark.

BRIEF DESCRIPTION OF THE ACCOMPANYING DRAWINGS

DETAILED DESCRIPTION OF THE EMBODIMENTS

Hereinafter, an embodiment according to the invention is described with reference to the accompanying drawings.

As described below, a bookmark thumbnail management function according to the embodiment is implemented on a mobile phone. The bookmark thumbnail management function enhances usability of managing bookmark thumbnails even if an operation unit of the mobile phone on which the bookmark thumbnail management function is implemented is limited in comparison with a PC (personal computer) having a relatively rich operation unit (including a keyboard and a pointing device). The bookmark thumbnail management function includes a bookmark thumbnail rearrangement function and a bookmark thumbnail representation function.

Figure 1:
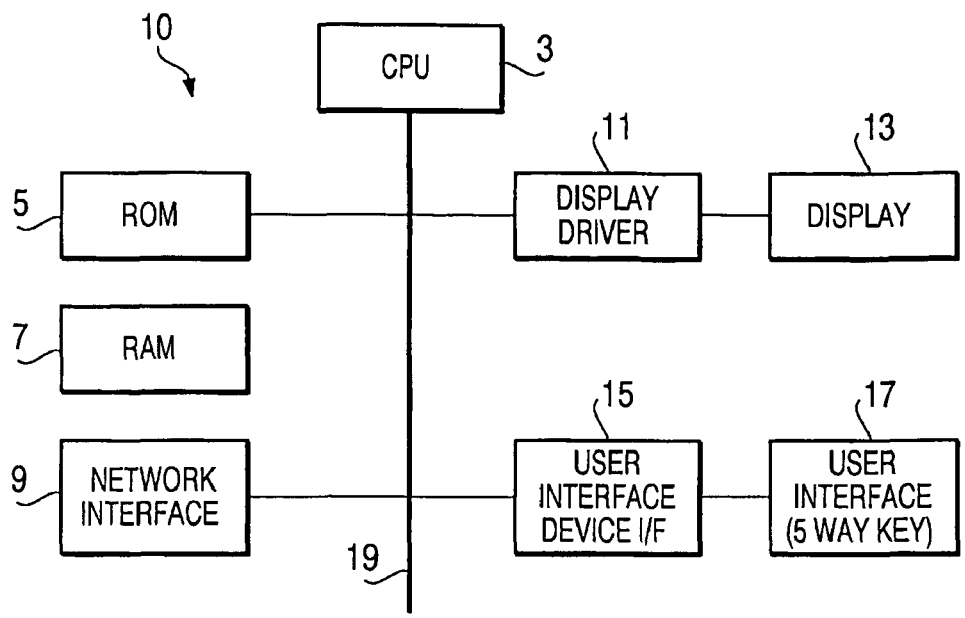
FIG. 1 is a block diagram showing a configuration of a mobile phone on which a bookmark thumbnail management function according to an embodiment is implemented.
Figure 2:
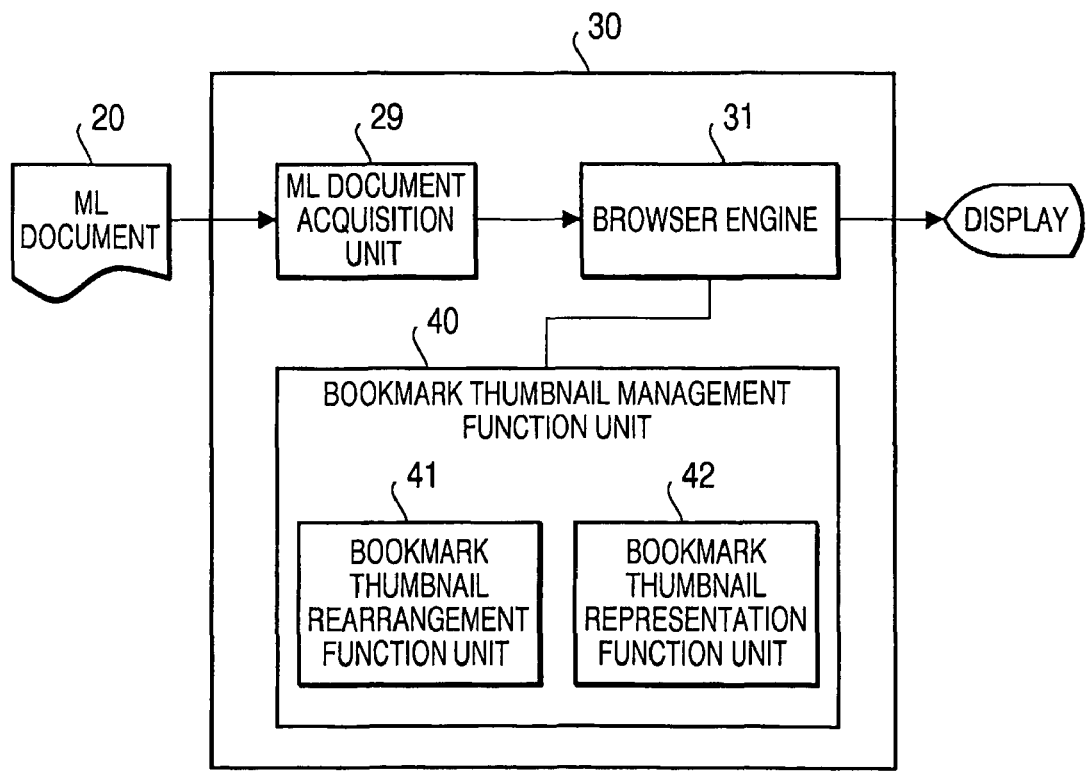
FIG. 2 is a functional block diagram of a browser running on the mobile phone shown in FIG. 1.

FIG. 1 is a block diagram showing a configuration of a mobile phone 10 on which the bookmark thumbnail management function according to the embodiment is implemented. FIG. 2 is a functional block diagram of a browser 30, as browsing software operating under control of a CPU 3 of the mobile phone 10. In this embodiment, the mobile phone 10 is assumed to be a device having a smaller display screen than a PC.

As shown in FIG. 1, the mobile phone 10 includes the CPU 3 for the overall control of the mobile phone 10, a ROM 5 storing various programs, a RAM 7, a network interface 9, a display driver 11 and a user interface device I/F 15. The above components are connected together by a bus 19. To the CPU 3, a display 13 and a user interface device 17 are connected via the display driver 11 and the user interface device I/F 15, respectively.

The user interface device 17 is a key operation unit including a five-way key (including up, down, right and left keys and an enter-key), numeric keys, etc. A program of the browser 30 is stored in the ROM 5, and the browser 30 starts up in response to a prescribed operation conducted by the user through the user interface device 17.

The browser 30 operates as follows. When the user inputs a URI (Uniform Resource Identifier) or selects an anchor (URI) on a Web page currently displayed, an ML (Markup Language) document 20 of the URI designated by the user is obtained by an ML document acquisition unit 29 via a network and inputted to a browser engine 31. The browser engine 31 has basic functions of parsing, rendering and displaying the ML document 20.

Specifically, the browser engine 31 includes a parser, a page maker and a formatter as its functional blocks. The parser parses a logical structure of the ML document 20 and thereby generates a document tree regarding the structure of the ML document. Incidentally, the document tree does not contain information on expressions of the document. The page maker generates a layout tree containing information on various expressive forms (block, inline, table, list, item, etc.) specified by tags, based on the document tree. The layout tree indicates the order of arrangement of the elements (block, inline, table, etc.) of the ML document. However, the layout tree does not contain information on the layout of the elements, such as the position and the size (width, height) of each element displayed on the screen, where to start new lines (positions of line feeds in character strings), etc.

The formatter sets the layout based on the layout tree, using information on the actual display screen (e.g. display screen width). In other words, the formatter determines the positions of line feeds and the position, width and height of each element on the actual display screen while successively arranging the contents of the layout tree on the screen. By the above process executed by the browser engine 31 including the parser, the page maker and the formatter, the ML document 20 is displayed on the display screen of the mobile phone 10.

The browser 30 further includes a bookmark thumbnail management function unit 40 including a bookmark thumbnail rearrangement function unit 41 and a bookmark thumbnail representation function unit 42. Under control of the bookmark thumbnail management function unit 40, a web page displayed on the display 13 can be stored in a storage device (e.g., a flash memory) (not shown) of the mobile phone 10 as a thumbnail. The user is thus able to save bookmark thumbnails in the mobile phone 10.

Figure 3:
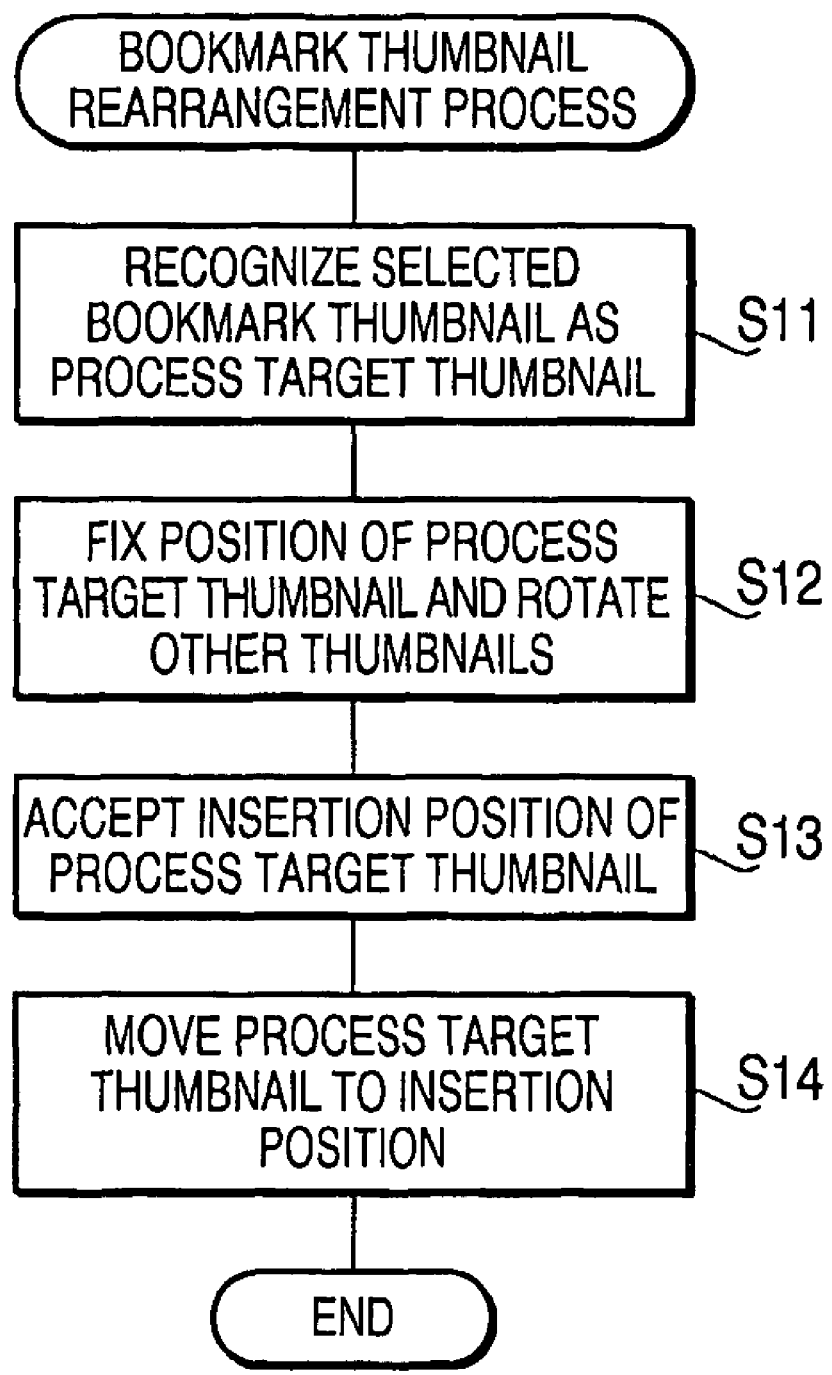
FIG. 3 is a flowchart illustrating a bookmark thumbnail rearrangement process executed by a bookmark thumbnail rearrangement function unit in the browser.
Figure 4:
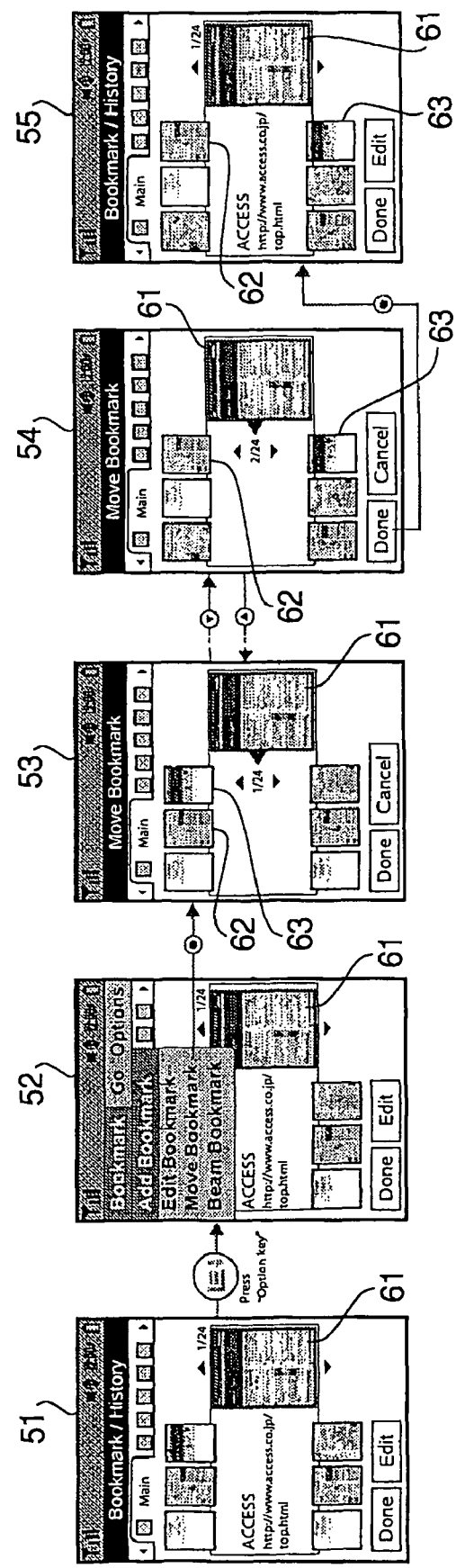
FIG. 4 illustrates an example of transitions of onscreen representation during the bookmark thumbnail rearrangement process.

Hereafter, the bookmark thumbnail rearrangement function attained by the bookmark thumbnail rearrangement function unit 41 is described. FIG. 3 is a flowchart illustrating a bookmark thumbnail rearrangement process executed by the bookmark thumbnail rearrangement function unit 41 (i.e., executed under control of the CPU 3). FIG. 4 illustrates an example of transitions of onscreen representation during the bookmark thumbnail rearrangement process.

Before calling the bookmark thumbnail rearrangement function, the user operates the user interface device 17 to display the stored bookmark thumbnails on the display 13 (see a screen 51 shown in FIG. 4). In the screen 51, the stored bookmark thumbnails are arranged in a ring shape. In this stage, the user is able to rotate the ring-shaped arrangement of the bookmark thumbnails by pressing an up-key or down-key of the five-way key to select one of the bookmark thumbnails. In the ring arrangement of the bookmark thumbnails, one of the bookmark thumbnails (a process target thumbnail) located at a center is displayed in a relatively large size on the screen 51 (see a bookmark thumbnail 61 on the screen 51). In this stage, the user is able to confirm selection of the bookmark thumbnail 61 as a process target thumbnail by pressing the enter-key.

After selecting the process target thumbnail (the bookmark thumbnail 61), the user is able to call the bookmark thumbnail rearrangement function by conducting a predetermined user operation through the user interface device 17 (e.g., by pressing an "Option key" and then designating "Move Bookmark" on a pop-up menu) as shown in a screen 52 of FIG. 4. At this stage, the bookmark thumbnail rearrangement process shown in FIG. 3 is initiated.

First, the CPU 3 recognizes the selected bookmark thumbnail 61 as a process target thumbnail (step S11). Then, control proceeds to step S12 and the onscreen representation moves to a state of a screen 53. In the state of the screen 53, the user is able to designate a target position to which the process target thumbnail 61 is to be moved by operating the five-way key. More specifically, by pressing the up-key or down-key, the stored bookmark thumbnails other than the process target thumbnail arranged in a ring shape rotate in a counterclockwise or clockwise direction (step S12). That is, the position of the process target thumbnail 61 is fixed, and only the bookmark thumbnails other than the process target thumbnail 61 rotate as shown in a screen 54 of FIG. 4.

After rotating the ring-shaped arrangement of the bookmark thumbnails to a desired position, the user confirms designation of the target position by pressing the enter-key in the state of the screen 54 (step S13). In the example of the screen 54, the user designated the target position between a bookmark thumbnail 62 and a bookmark thumbnail 63. After the target position is confirmed by the user on the screen 54, the CPU 3 moves the process target bookmark thumbnail 61 to the position between the bookmark thumbnails 62 and 63 as shown in a screen 55 of FIG. 4 (step S14).

As described above, according to the above mentioned bookmark thumbnail rearrangement function, the user is able to designate the target position to which the selected bookmark thumbnail is to be inserted while visually recognizing both of the selected bookmark thumbnail and the target position. Therefore, usability of rearranging bookmark thumbnails can be enhanced in particular for a device which is provided with only a five-way key and does not provided with a pointing device.

Figure 5:
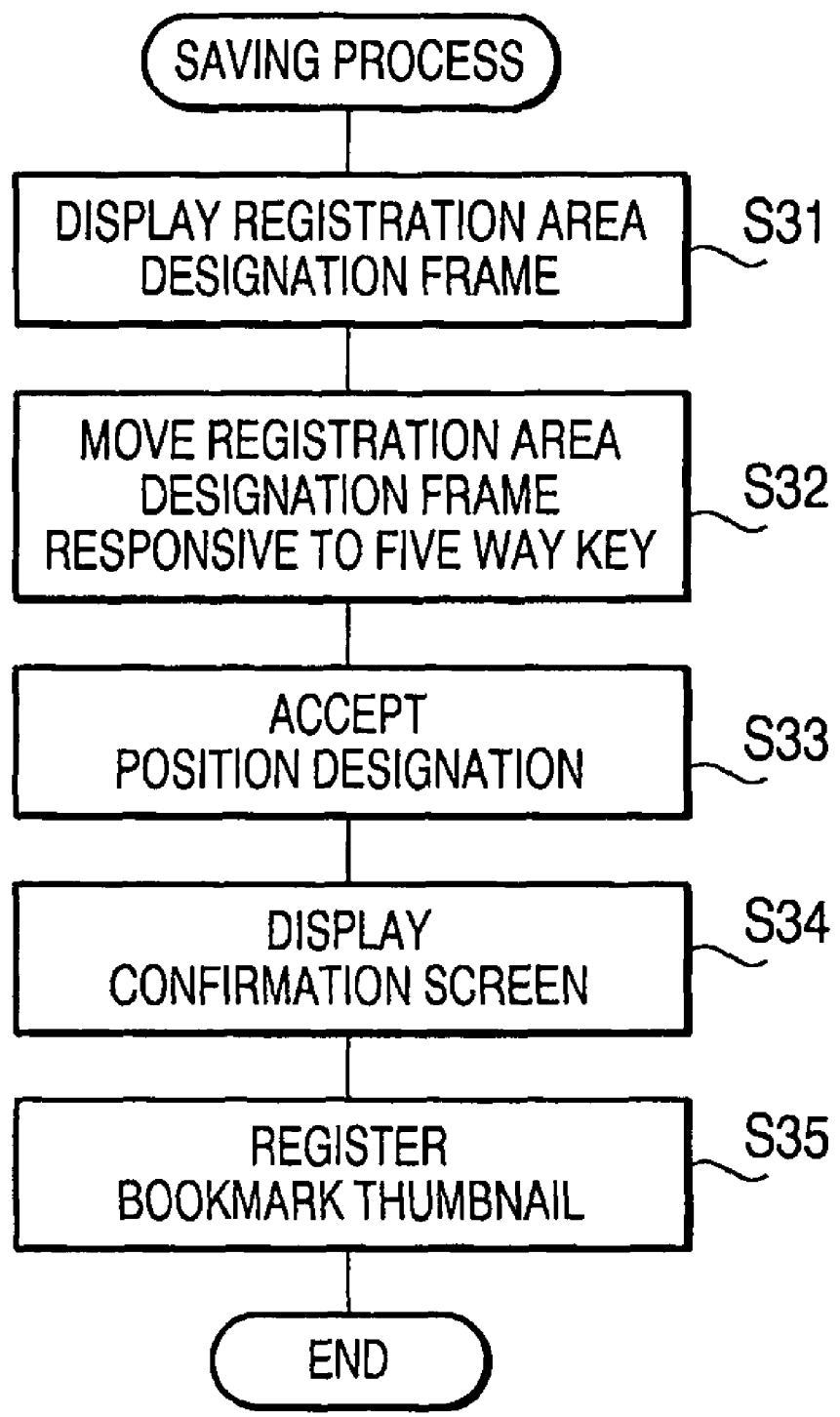
FIG. 5 is a flowchart illustrating a saving process for saving a bookmark thumbnail of a web page executed by a bookmark thumbnail representation function unit in the browser.
Figure 6:
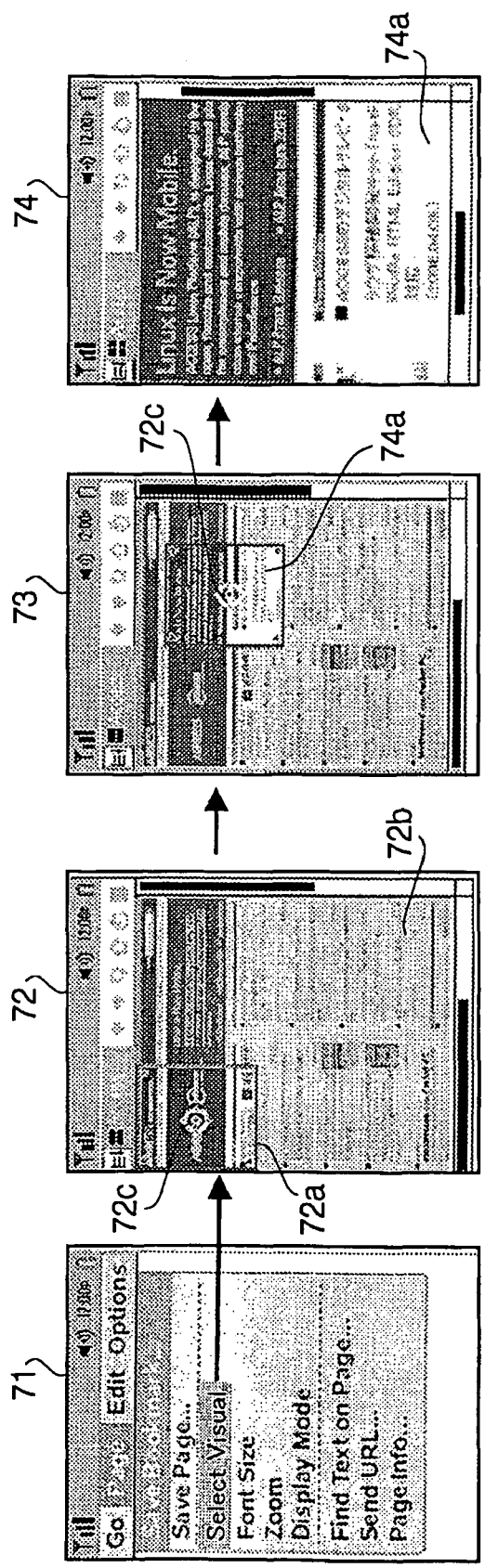
FIG. 6 illustrates transitions of onscreen representation in the saving process.

Hereafter, the bookmark thumbnail representation function according to the embodiment is described. FIG. 5 is a flowchart illustrating a saving process for saving a bookmark thumbnail of a web page executed by the bookmark thumbnail representation function unit 42 (i.e., executed under control of the CPU 3). FIG. 6 illustrates transitions of onscreen representation in the saving process.

When a web page is displayed on the display 13 by the browser 30, the user is able to call a saving function as a part of the bookmark thumbnail representation function by designating a "Select Visual" item on a pop-up menu as shown in a screen 71 of FIG. 6. When the "Select Visual" item is designated by the user, the saving process shown in FIG. 5 is initiated. First, a registration area designation frame 72a is displayed on the web page 72b as shown in a screen 72 of FIG. 6 (step S31). In this state of the screen 72, the user is able to move the registration area designation frame 72a using the five-way key. The CPU 3 moves the registration area designation frame 72a on the web page 72b in response to a user operation through the five-way key (step S32). In this state, the user is also able to scale up or down the registration area designation frame 72a to a desired size.

If the user designates a region to be saved as a bookmark thumbnail by moving the registration area designation frame 72a at a desired position (see a screen 73) and then pressing the enter-key (step S33). After a region 74a to be saved as a bookmark thumbnail is designated, the CPU 3 displays a confirmation screen 74 on the display 13 (step S34). Then, the CPU 3 registers the designated region 74a as a bookmark thumbnail in the storage device (not shown) of the mobile phone 10 (step S35).

In step S35, a URL (Uniform Resource Locator) of a web page corresponding to a designated bookmark thumbnail is stored in association with the designated bookmark thumbnail. In this embodiment, information including a captured image of the entire selected web page 72b and position information representing a positional relationship between a designated bookmark thumbnail and the entire web page corresponding to the designated bookmark thumbnail is additionally stored in the mobile phone 10 in association with the bookmark thumbnail. Hereafter, such additional information stored in association with each bookmark thumbnail is referred to as bookmark information.

Figure 7:
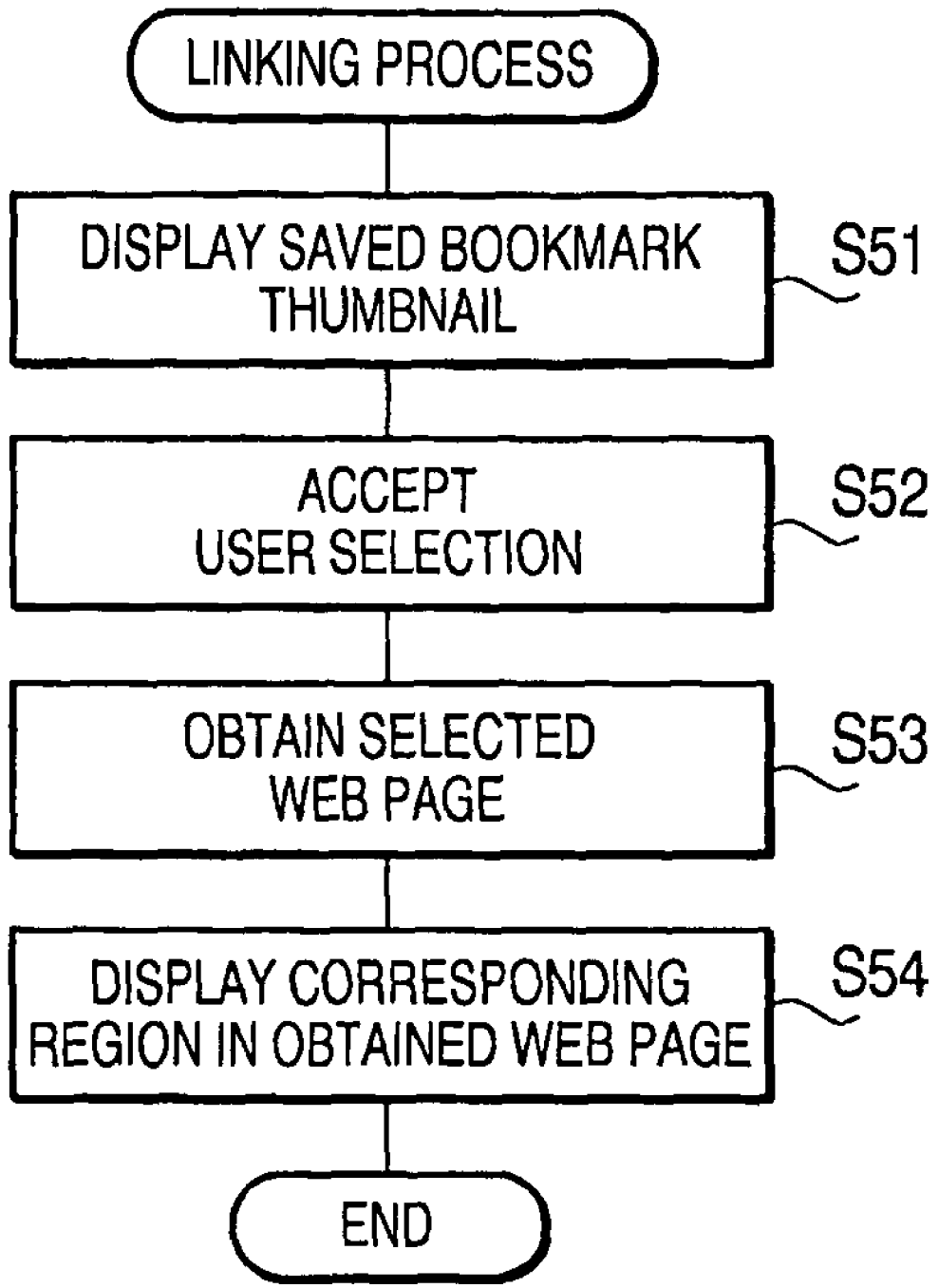
FIG. 7 is a flowchart illustrating a linking process executed by the bookmark thumbnail representation function unit.
Figure 8:
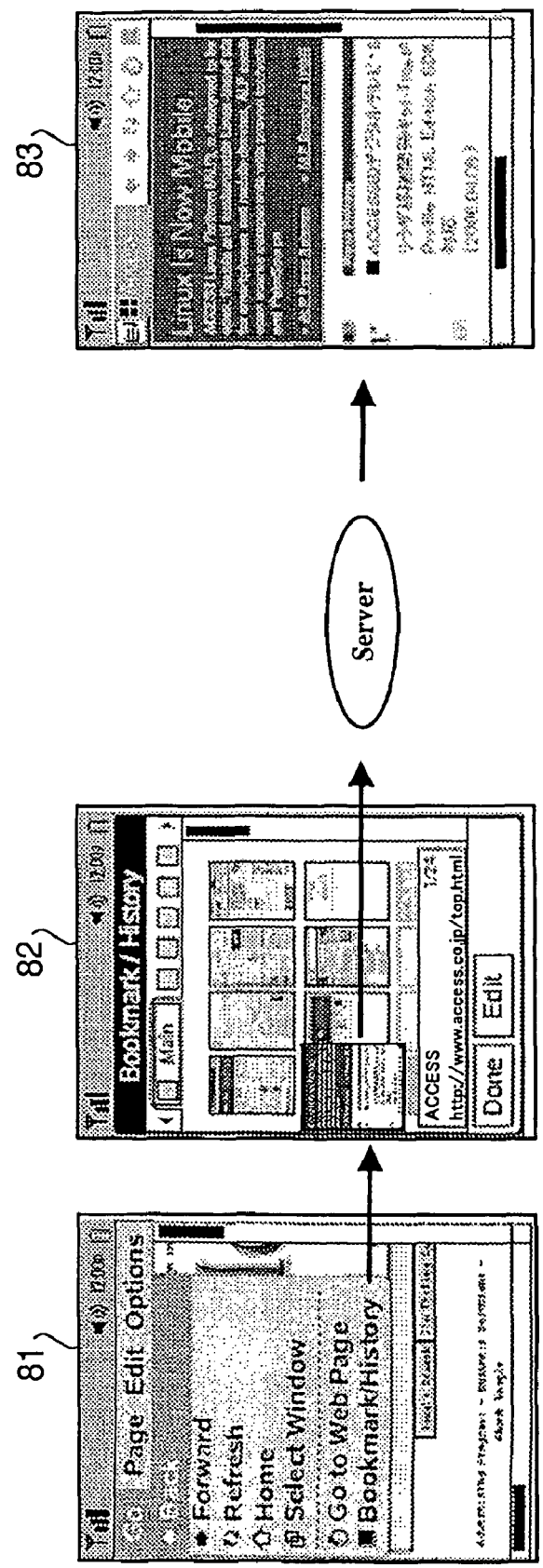
FIG. 8 illustrates transitions of onscreen representation in the linking process.

FIG. 7 is a flowchart illustrating a linking process executed by the bookmark thumbnail representation function unit 42 (i.e., executed under control of the CPU 3). FIG. 8 illustrates transitions of onscreen representation in the linking process. When the user calls a bookmark/history function of displaying the saved bookmark thumbnails on the display 13 by designating an item "Bookmark/History" on a pop-up menu (see a screen 81 of FIG. 8), the linking process is initiated.

First, the CPU 3 displays the bookmark thumbnails saved in the mobile phone 10 as shown in a screen 82 of FIG. 8 (step S51). In the screen 82, the saved bookmark thumbnails may be arranged in a ring shape as in the case of the screen 51 of FIG. 4. Then, the CPU 3 accepts a user operation for selecting a desired bookmark thumbnail (step S52). When the user designates one of bookmark thumbnails, the CPU 3 obtains a web page corresponding to the designated bookmark thumbnail in accordance the bookmark information associated with the designated bookmark thumbnail through a network (step S53). Then, the CPU 3 displays a part of the obtained web page corresponding to the saved region of the designated bookmark thumbnail (step S54). The saved region is determined based on the positional relationship between the designated bookmark thumbnail and the entire web page corresponding to the designated bookmark thumbnail registered in the saving process.

With this configuration, the user is able to obtain a part of the designated web page corresponding to the enlarged view of the designated bookmark thumbnail by only designating a desired bookmark thumbnail. There is no necessity for the user to scroll up or down the obtained web page to display a part of the web page matching the saved region of the bookmark thumbnail.

Figure 9:
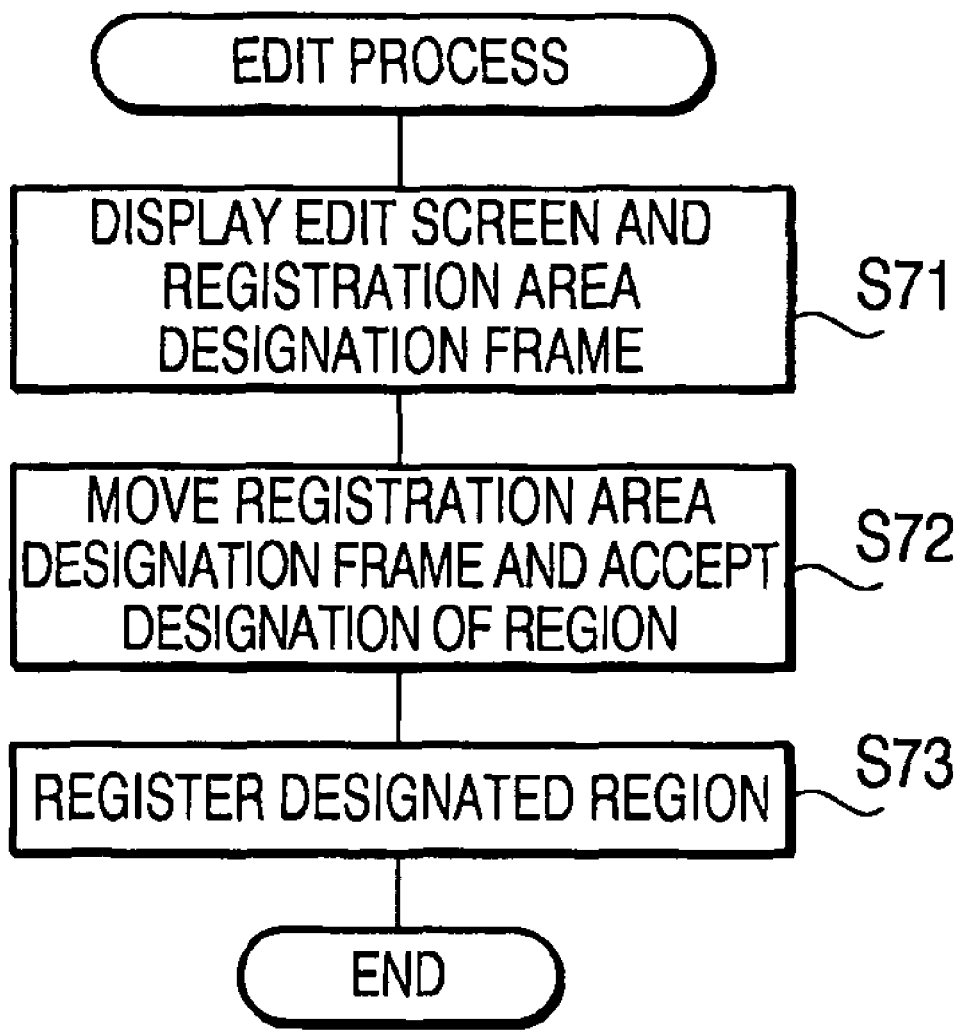
FIG. 9 is a flowchart illustrating an edit process for editing a bookmark thumbnail executed by the bookmark thumbnail representation function unit.
Figure 10:
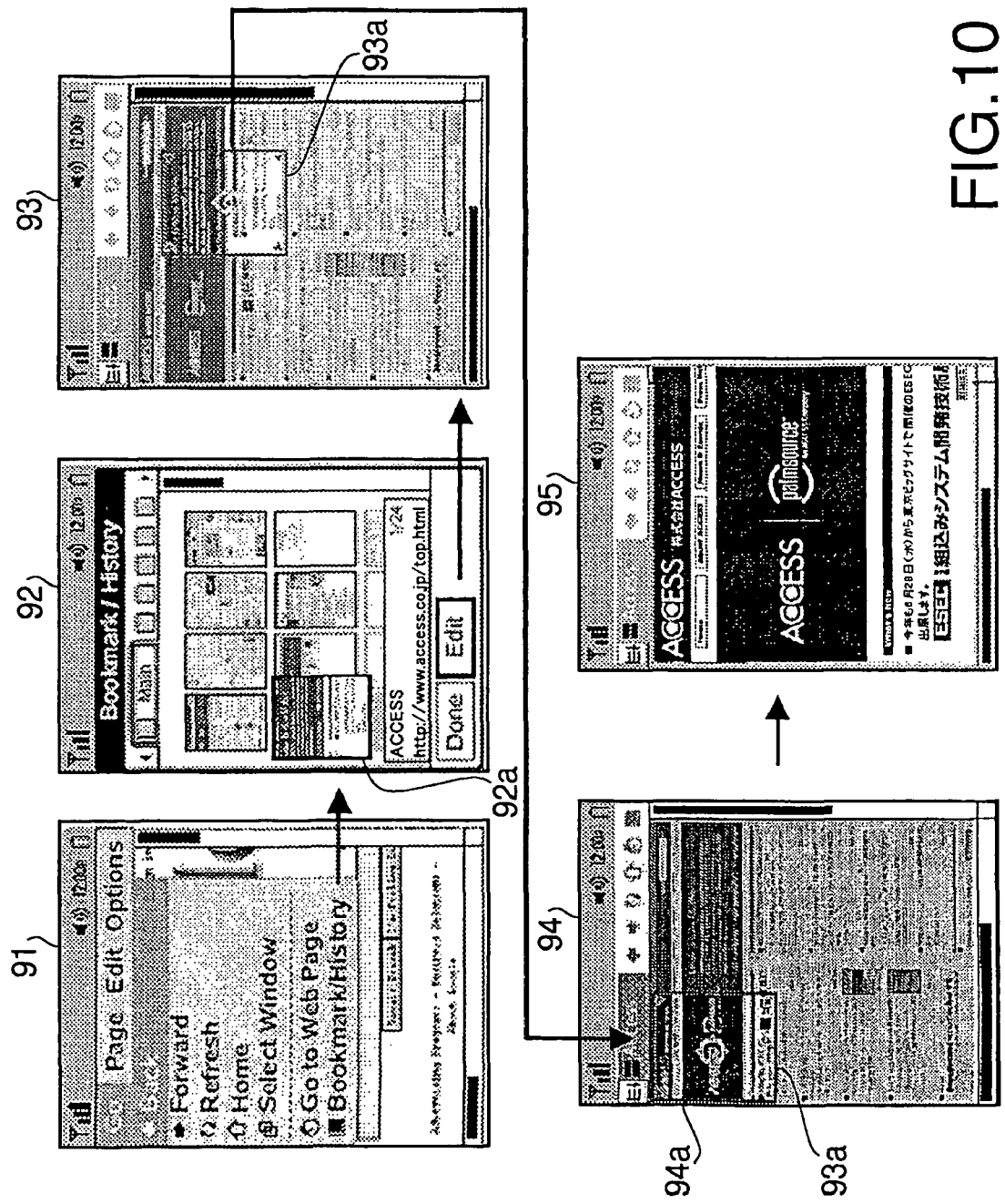
FIG. 10 illustrates transitions of onscreen representation in the edit process.

FIG. 9 is a flowchart illustrating an edit process for editing a bookmark thumbnail executed by the bookmark thumbnail representation function unit 42 (i.e., executed under control of the CPU 3). FIG. 10 illustrates transitions of onscreen representation in the edit process. When the user calls the bookmark/history function of displaying the saved bookmark thumbnails on the display 13 by designating an item "Bookmark/History" on a pop-up menu (see a screen 91 of FIG. 10), designating a bookmark thumbnail 92a to be edited and then designating a "Edit" button (see a screen 92 of FIG. 10), the edit process is initiated. In the screen 92, the saved bookmark thumbnails may be arranged in a ring shape as in the case of the screen 51 of FIG. 4.

When the edit process is designated by the user in the state where a bookmark thumbnail (a partial image of a web page) or more than two bookmark thumbnails are displayed, the entire web page corresponding to the designated bookmark thumbnail (92a) is displayed and a registration area designation frame 93a is located on the entire web page at a position corresponding to the region of the designated bookmark thumbnail (92a) in the entire web page as shown in a screen 93 (step S71). It should be noted that the mobile phone 10 is able to display the entire web page of the designated bookmark thumbnail because the bookmark information associated with the designated bookmark thumbnail contains the captured image of the entire web page of the designated bookmark thumbnail. In the state of the screen 93, the user is able to scroll the displayed area of the web page.

In the state of the screen 93, the user is also able to move the registration area designation frame 93a, for example, by operating the five-way key, and to designate a region of the web page to be newly stored as a bookmark thumbnail (step S72). For example, as shown in a screen 94, the user moves the registration area designation frame 93a to a desired region 94a and then confirms the designation of the region by pressing the enter-key. If the designation of the region 94a is confirmed, the CPU 3 saves the region 94a as a bookmark thumbnail and displays a confirmation screen 95 representing the enlarged view of the user-designated region 94a as shown in a screen 95 of FIG. 10 (step S73). In step S73, the bookmark information containing the captured image of the entire web page corresponding to the registered bookmark thumbnail and information representing a positional relationship between the designated region 94a and the entire web page is also stored in the mobile phone 10 in association with the newly designated bookmark thumbnail.

Although the bookmark information stored in association with each bookmark thumbnail in step S35 includes a captured image of the entire web page corresponding to a designated bookmark thumbnail and the position information of the designated bookmark thumbnail, various types of information representing a positional relationship between a designated bookmark thumbnail and the entire web page corresponding to the designated bookmark thumbnail may be used as the bookmark information. The following items A), B) and C) are information available for use of the bookmark information. The item A) is the above mentioned bookmark information stored in step S35.

A) a captured image of an entire web page corresponding to a designated bookmark thumbnail; and
position information representing a positional relationship between a designated bookmark thumbnail and the entire web page.
B) data of a part of the entire web page within a region corresponding to a designated bookmark thumbnail (e.g., a tag, a word or a character string found in the designated bookmark thumbnail).
C) the byte number representing a position of a designated bookmark thumbnail counted from a top of a web page corresponding the designated bookmark thumbnail.

The bookmark information does not necessarily require a captured image of an entire web page. therefore, in the bookmark information of the item A) may be formed by only the position information representing a positional relationship between a designated bookmark thumbnail and the entire web page. In this case, the mobile phone 10 may obtain the entire image of a web page corresponding to a designated bookmark thumbnail through a network, and identify a designated part as the bookmark thumbnail within the entire web page in accordance with the stored positional relationship between the designated bookmark thumbnail and the entire web page.

Alternative to storing a captured image of an entire web page, markup-language document data (e.g., HTML data) of the web page may be stored, for example, as the bookmark information of the item A).

With regard to the bookmark information of the item B), a designated region (i.e., a region represented by a bookmark thumbnail in the entire web page) is determined by parsing obtained contents (markup-language document) because the data (a tag, a word or a character string) stored as the item B) is information contained in the markup-language document.

With regard to the bookmark information of the item C), the byte number represents a position of a bookmark thumbnail in a mark-up language document.

The position information in the item A) may be information roughly representing the location of the designated bookmark thumbnail within the entire web page. Because in each of the items B) and C), the captured image of the entire web page is not saved, the edit process shown in FIGS. 9 and 10 can not be performed. However, by additionally saving the captured image of the entire web page for each of the items B) and C), the edit process can be performed.

It is understood that by calling the linking process while designating the bookmark thumbnail of the region 94a, the user is able to obtain a web page corresponding to the designated bookmark thumbnail through the network and to display a part of the web page corresponding to the region 94a without scrolling the web page to move a display area to the location corresponding to the region 94a. More than one bookmark thumbnails respectively representing different regions on the same web page may be saved in the mobile phone 10. It should be noted that the above mentioned edit process for editing a region on a web page to be saved as a bookmark thumbnail can be performed under an offline state.

According to the above mentioned bookmark thumbnail representation function, the user is able to start to browse contents at a position corresponding to a designated bookmark thumbnail.

Although the present invention has been described in considerable detail with reference to certain preferred embodiments thereof, other embodiments are possible.

For example, the above mentioned bookmark thumbnail management function can be implemented in various types of devices although in the above mentioned embodiment the bookmark thumbnail management function is implemented in a mobile phone.

In the above mentioned embodiment, a thumbnail image and an entire image of a web page are stored as different image files. However, only an entire image of a web page may be stored, without storing a thumbnail image. In this case, the mobile phone is able to display a bookmark thumbnail by cutting out a part of the entire image corresponding to a region of the bookmark thumbnail based on the information (e.g., the bookmark information) stored in association with the entire image and displaying the cut part as the bookmark thumbnail.

The mobile phone 10 may be configured to employ a stylus as the user interface device 17. In this case, the mobile phone 10 may provide the screens 72 and 73 in the saving process so that the user is able to change the size of the registration area designation frame 72a by designating corners of the frame 72a through the stylus, and that the position of the frame 72a can be changed by designating a central circled area 72c of the frame 72a by the stylus.

Information on page setting (e.g., a rendering mode, a font size, and a zoom size) may be additionally stored as bookmark information. The "rendering mode" is, for example, a "DeskTopView mode", a "smart-fit mode" or a "Text mode". The "DeskTopView mode" means a mode in which a web page is displayed as in the case of a screen of a web page formed on a personal computer. The "smart-fit mode" means a mode in which a web age is reconfigured so as to fit a relatively small screen. The "Text mode" means a mode in which only text of a web page is displayed.

If the information on page setting is saved together with a bookmark thumbnail in the saving process shown in FIG. 5, an obtained web page corresponding to the saved bookmark thumbnail is displayed in the linking process shown in FIG. 7 in accordance with the information on page setting. In this case, the information on page setting can be edited in the edit process shown in FIG. 9.

If the page setting is stored as the bookmark information, the edit process may be configured such that the page setting can additionally be changed. It is understood that editing of the page setting in offline can be achieved by storing HTML data of a page corresponding to a designated thumbnail.

What is claimed is:

1. A device having a function of browsing contents obtained through a network, comprising:
    a display unit;
    an operation unit operated by a user;
    a storing unit configured to store a thumbnail corresponding to a part of a captured image of contents as a bookmark; and
    a thumbnail rearrangement control unit configured to form a screen displaying stored thumbnails on the display unit while arranging the thumbnails in a ring shape, to rotate the thumbnails arranged in the ring shape on the screen in response to a user operation through the operation unit, to accept user designation of a target thumbnail, which is one of the thumbnails arranged in the ring shape, to be moved through the operation unit, to rotate, when the target thumbnail is designated, the thumbnails other than the target thumbnail arranged in the ring shape on the screen in response to the user operation through the operation unit while keeping a position of the target thumbnail at a predetermined position in the screen, and to accept user designation of a new position in the ring shape into which the target thumbnail is to be re-inserted.

2. The device according to claim 1, wherein the thumbnail rearrangement control unit recognizes the target position as a position between bookmark thumbnails situated next to the target thumbnail on the screen.

3. The device according to claim 1, wherein the storing unit stores a thumbnail as a bookmark by displaying a registration area designation frame on contents, moving the registration area designation frame on the contents in response to a user operation through the operation unit, accepting user designation for designating a region in the contents to be stored as a thumbnail and represented by the registration area designation frame, storing a thumbnail image as the thumbnail corresponding the region in the contents as a bookmark while associating at least position information representing a positional relationship between the region and an entire page of the contents with the thumbnail stored as the bookmark.

4. The device according to claim 3, wherein the storing unit stores an entire image of the contents and a thumbnail corresponding the region in the contents as a bookmark while associating the entire image of the contents and the position information with the thumbnail stored as the bookmark.

5. The device according to claim 3, wherein the position information includes at least one of a tag, a word and a character string contained in the region of the contents.

6. The device according to claim 3, wherein the position information includes a byte number of the region counted form a top of the contents.

7. The device according to claim 3, further comprising:
    a link control unit configured to display thumbnails saved as bookmarks, to accept user selection of one of the saved thumbnails, to obtain contents corresponding to the selected one of the saved thumbnails through the network, and to display a part of the obtained contents corresponding to a region in the contents represented by the selected thumbnails in accordance with the position information.

8. The device according to claim 3, further comprising:
    an edit control unit configured to display thumbnails saved as bookmarks, to accept user selection of one of the saved thumbnails, to display contents corresponding to the selected thumbnail, to display a registration area designation frame on the contents, to move the registration area designation frame on the contents in response to a user operation through the operation unit, to accept user designation for designating a region in the contents to be newly stored as a thumbnail and represented by the registration area designation frame, to newly store a thumbnail corresponding the region in the contents as a bookmark while associating an entire page of the contents and position information representing a positional relationship between the region and the entire page of the contents with the thumbnail stored as the bookmark.

9. The device according to claim 4, further comprising:
an edit control unit configured to display thumbnails saved as bookmarks, to accept user selection of one of the saved thumbnails, to display contents corresponding to the selected thumbnail, to display a registration area designation frame on the contents, to move the registration area designation frame on the contents in response to a user operation through the operation unit, to accept user designation for designating a region in the contents to be newly stored as a thumbnail and represented by the registration area designation frame, to newly store a thumbnail corresponding the region in the contents as a bookmark while associating an entire image of the contents and position information representing a positional relationship between the region and the entire image of the contents with the thumbnail stored as the bookmark.

10. The device according to claim 1, wherein the operation unit comprises a five-way key.

11. The device according to claim 1, wherein the device is a mobile phone.

12. A method of rearranging thumbnails saved as bookmarks in a device having a function of browsing contents obtained through a network, comprising:
forming a screen displaying stored thumbnails on a display unit while arranging the thumbnails in a ring shape;
rotating the thumbnails arranged in the ring shape on the screen in response to a user operation through an operation unit;
accepting user designation of a target thumbnail, which is one of the thumbnails arranged in the ring shape, to be moved through the operation unit;
rotating, when the target thumbnail is designated, the thumbnails other than the target thumbnail arranged in the ring shape on the screen in response to the user operation through the operation unit while keeping a position of the target thumbnail at a predetermined position in the screen; and
accepting user designation of a new position in the ring shape into which the target thumbnail is to be re-inserted.

13. A computer program product comprising a computer-readable medium containing computer readable instructions that cause a computer to:
form a screen displaying stored thumbnails on a display unit while arranging the thumbnails in a ring shape;
rotate the thumbnails arranged in the ring shape on the screen in response to a user operation through an operation unit;
accept user designation of a target thumbnail, which is one of the thumbnails arranged in the ring shape, to be moved through the operation unit;
rotate, when the target thumbnail is designated, the thumbnails other than the target thumbnail arranged in the ring shape on the screen in response to the user operation through the operation unit while keeping a position of the target thumbnail at a predetermined position in the screen; and
accept user designation of a new position in the ring shape into which the target thumbnail is to be re-inserted.

* * * * *